Patented Oct. 10, 1922.

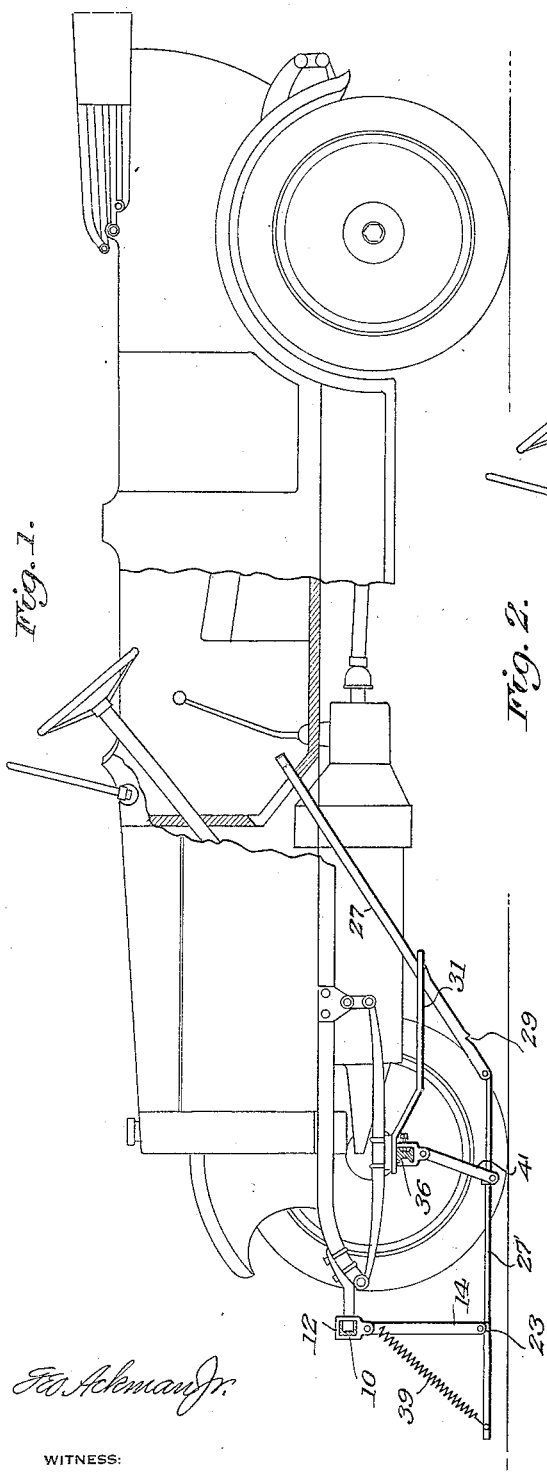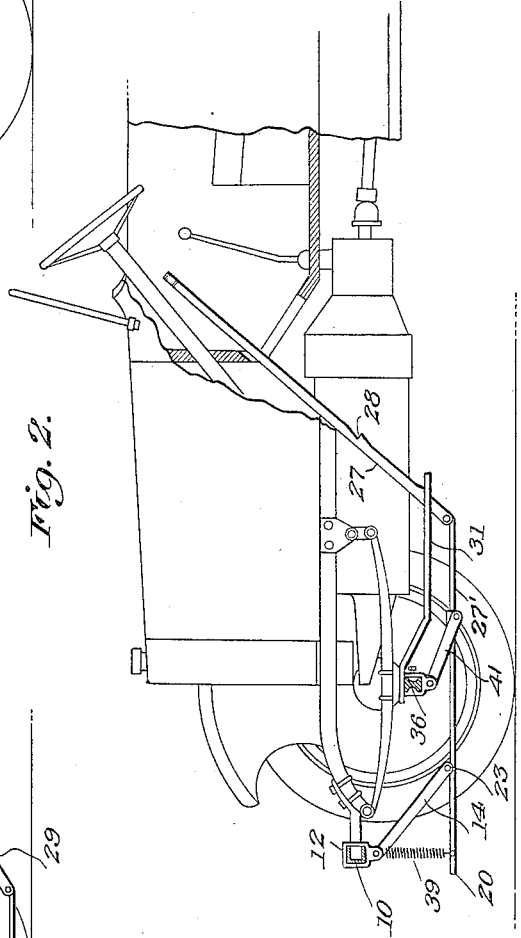

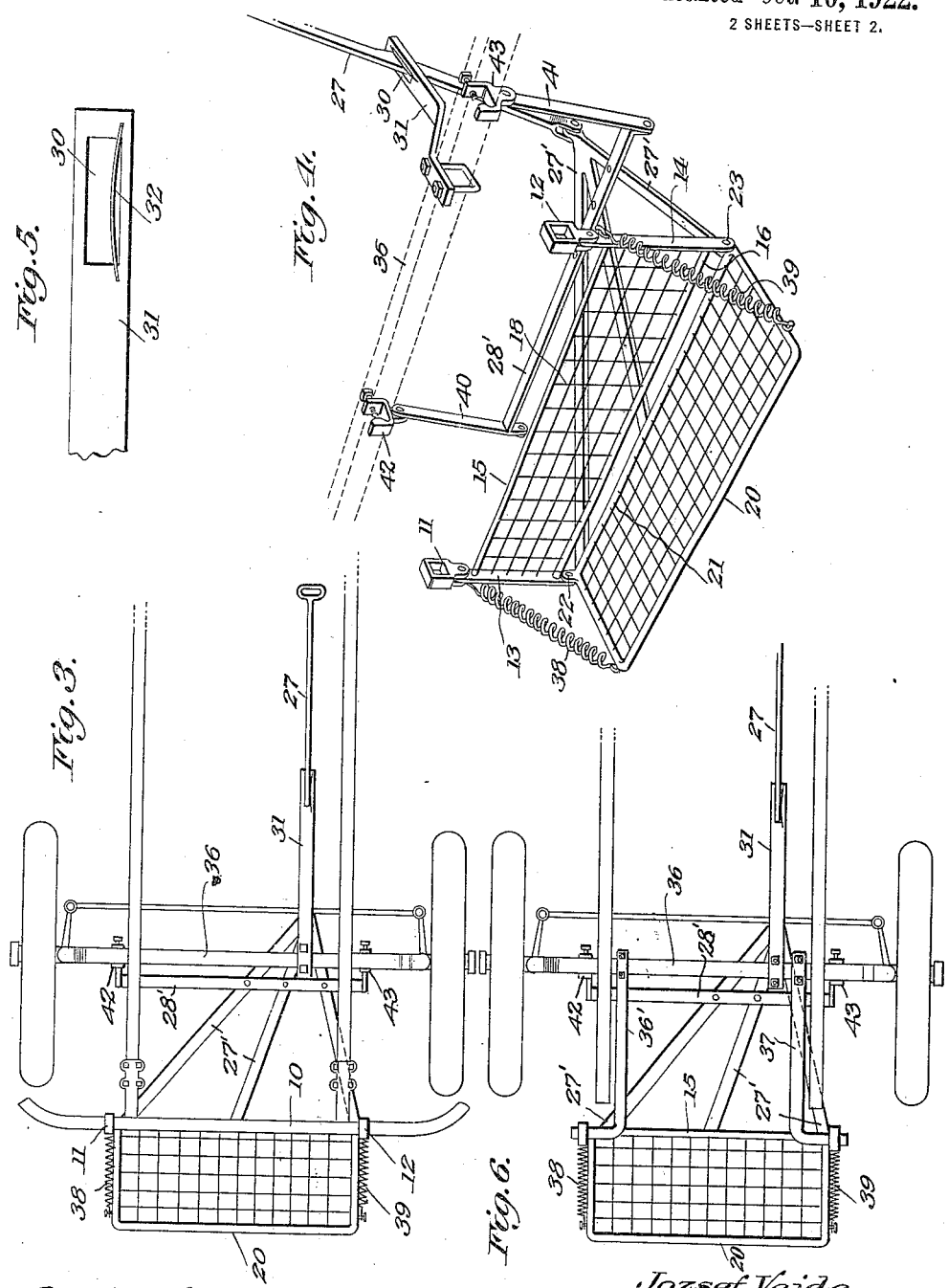

1,431,855

UNITED STATES PATENT OFFICE.

JOZSEF VAJDA, OF COLUMBUS, OHIO.

FENDER.

Application filed December 27, 1921. Serial No. 524,990.

*To all whom it may concern:*

Be it known that I, JOZSEF VAJDA, a citizen of Hungary, residing at Columbus, in the county of Franklin and State of Ohio, have invented new and useful Improvements in Fenders, of which the following is a specification.

This invention relates to fenders for motor cars, and the object is to provide a device which may in one form of the construction be carried by the bumper, in a normally raised position, with means under the control of the operator of the car for throwing the fender to lower and operative position when occasion may require, so that an individual who may be struck by the car will not pass under the wheels or under the car body.

A further object is to provide a device including particular mounting means and particular controlling means as hereafter specified.

With the foregoing and other objects in view, the invention consists in the novel construction and arrangement of elements described and claimed it being understood that modifications may be made within the scope of the claims without departing from the spirit of the invention.

In the drawings, Figure 1 shows the device in side elevation, as applied to a motor car; Figure 2 is a side elevation of the fender, in inoperative position on the car; Figure 3 is a top plan view; Figure 4 is a perspective view, the front axle being in dotted lines; Figure 5 is a detail of the end of the slotted bar which cooperates with the operating lever for the fender; Figure 6 is a top plan view of a modified form showing the fender connected directly with the front axle by forwardly and outwardly extending bars.

A bumper 10 may be mounted in the usual manner at the forward portion of the frame of the motor car, and pivotally connected therewith by brackets 11 and 12 are depending arms or bars 13 and 14 connected by transverse bars 15 and 16 and the intervening structure 18, of any suitable form.

The pick-up element of the fender is designated 20 and includes transverse bar 21 pivoted at 22 and 23, to bars 13 and 14 above referred to.

An operating rod 27 is mounted adjacent to the steering pillar of the car and permits the operator to move the pick-up device to its lower and operative position—this position being maintained so long as the notch 28 on member 27 is engaged. The remaining notch 29 retains element 27 in position for holding the device inoperative.

Operating member 27 passes through the slot 30 in bar 31 secured to the front axle of the car, and extending along the slot is a spring 32 aiding in holding element 27 in a given position. The connections between element 27 and the fender per se are designated 27' and are secured to transverse bar 28' supported by pivoted bars 40, 41, of Figure 4. The bars last named are connected with brackets 42, 43, to be clamped to axle 36.

The device may be mounted directly on the front axle 36 of the car if the latter carries no bumper. In this case outwardly extending bars 36' and 37, of sufficient rigidity to support the fender are employed.

In each form of the device the fender per se may be of the same construction, and springs 38 and 39 are connected with depending bars 13 and 14 and with the pick-up element.

Having thus described my invention, I claim:

1. The combination with a bumper of a motor car and brackets connected therewith, of a fender connected with said brackets and having swinging movement, said fender comprising a plurality of relatively movable elements, devices for pivotally and resiliently mounting one of the movable elements to swing about a horizontal axis, and means under the control of the operator of the car for throwing the fender to operative and inoperative positions.

2. The combination with a bumper of a motor car and brackets connected therewith, of a fender pivotally connected with said brackets and having movement from a raised position to a lower position, a slotted member mounted in a stationary position, a controlling rod associated with the slotted member, means connected with said rod and with the fender for operating the latter, and devices on the controlling rod for engaging the slotted element and positioned to hold the latter in a raised position and in a lower operative position.

3. In a fender of the class described, a device comprising a plurality of relatively movable elements, mounting means therefor, springs connecting said elements, a slotted member mounted on the front axle of a motor car, a controlling rod passing through the slotted member, means for controlling the fender from the rod, and means for moving the fender corresponding to the movement of the front wheels when the car departs from a straight course.

4. In a fender of the class described, a device comprising a plurality of relatively movable elements, mounting means therefor, springs connecting said elements, a slotted member mounted on the front axle of a motor car, and extending rearwardly therefrom, a controlling rod passing through the slotted member, means for controlling the fender from the rod, and means for retaining the controlling rod in a plurality of positions, one of which determines the operative position of the fender.

In testimony whereof I affix my signature.

JOZSEF VAJDA.